Jan. 14, 1958 W. W. PHARIS 2,820,101

SELECTOR CIRCUIT FOR AUTOMATIC TELEPHONE SYSTEMS

Filed Oct. 2, 1952 2 Sheets-Sheet 1

INVENTOR.
WILLIAM W. PHARIS
BY Francis E. Blake
ATTORNEY

Jan. 14, 1958 W. W. PHARIS 2,820,101

SELECTOR CIRCUIT FOR AUTOMATIC TELEPHONE SYSTEMS

Filed Oct. 2, 1952 2 Sheets-Sheet 2

INVENTOR.
WILLIAM W. PHARIS

BY Francis E. Blake

ATTORNEY 2,820,101

SELECTOR CIRCUIT FOR AUTOMATIC TELEPHONE SYSTEMS

William W. Pharis, Rochester, N. Y., assignor, by mesne assignments, to General Dynamics Corporation, a corporation of Delaware Application October 2, 1952, Serial No. 312,686

9 Claims. (Cl. 179—18)

Figure 1:
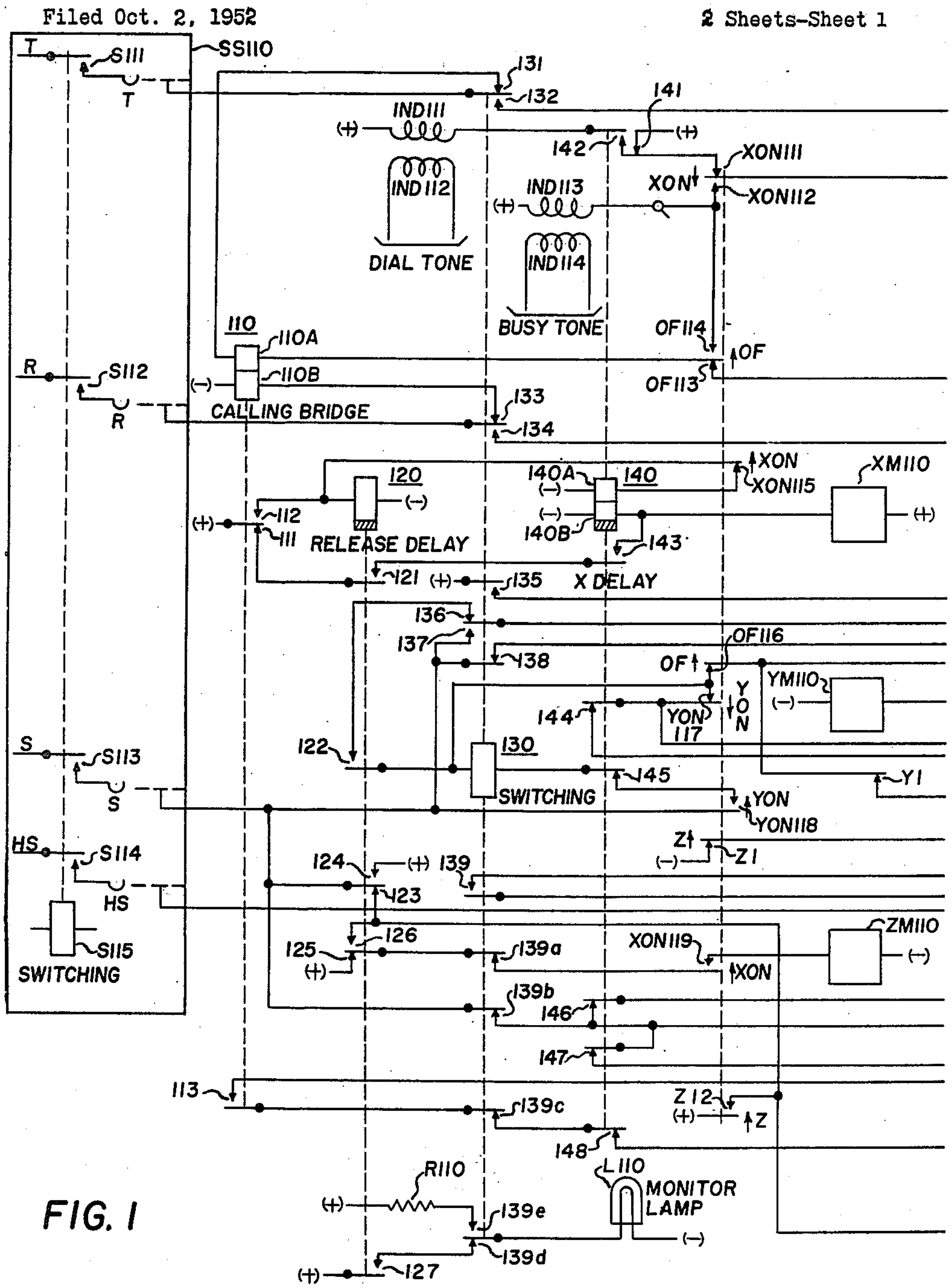
Figure 2:
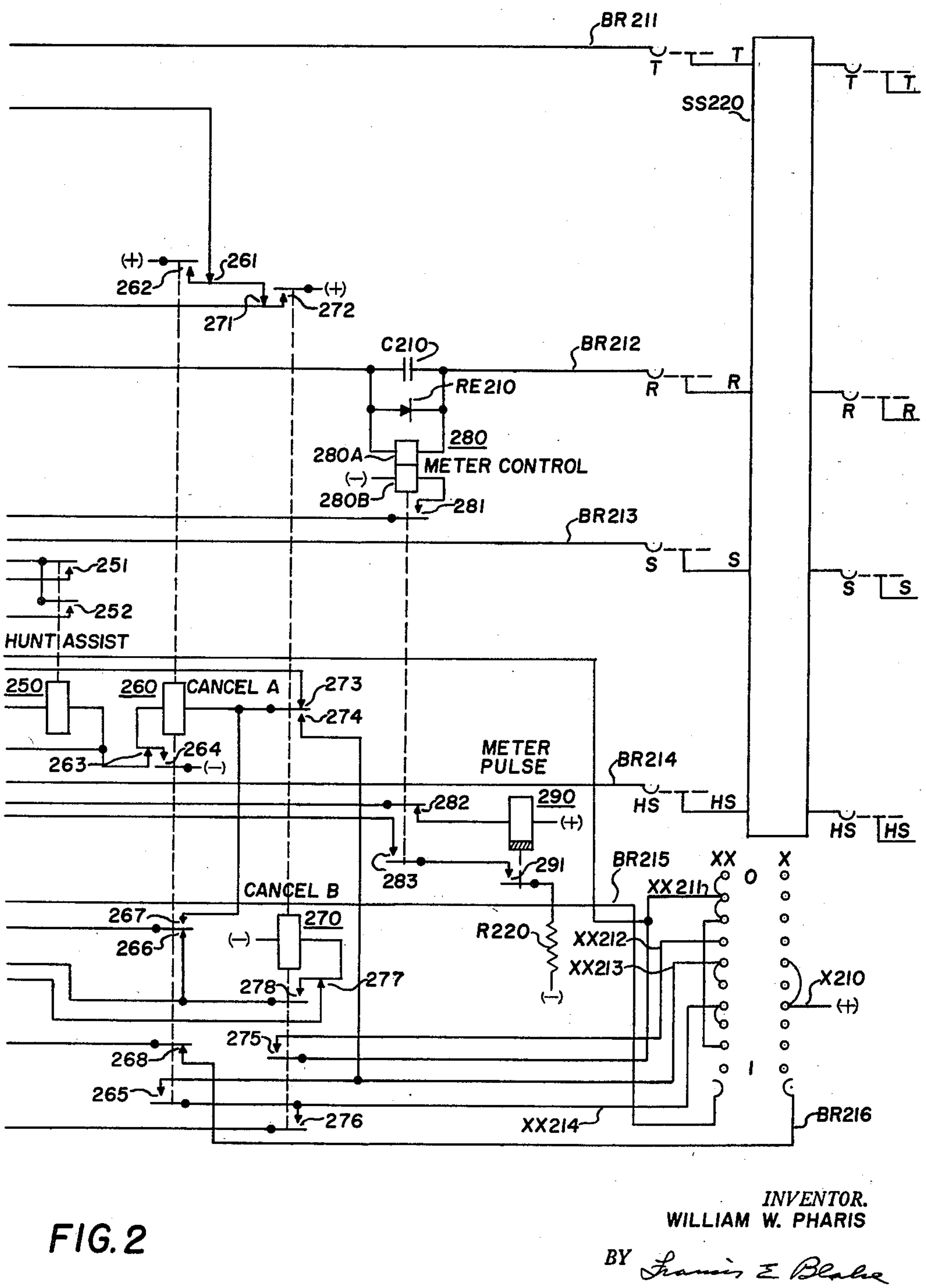

This invention relates to automatic telephone systems and more particularly to selector switching circuits which may be used for control by the directive impulses of one or more dialed digits, as required.

In previous selector switch circuits of this type, the first directive stepping and the various subsequent re-stepping features have been included in various combinations in several different selector switch circuits with no particular circuit embodying all the various possibilities inherent in the reuse of the selector switch for the impulses of more than one digit. For example, it is old to increase the flexibility and capacity of the numbering schemes and hence trunks available for use in automatic telephone systems by providing automatic drop-back operation of the selector stepping switch in the selector circuit when various ones of predetermined digits are dialed and in general such selector circuits require a particular form of relay wiring connected to contacts on the drop-back level so that any and all of the levels may not be subsequently reused for switching through. The use of such drop-back selector circuit and switch is particularly advantageous since it reduces the number of successive ranks of selector switches and circuits required for complex numbering systems. Drop-back selectors are known to provide the feature of digit adding and function to switch through on certain levels after a previous drop-back from such level. Other drop-back selectors are known to provide digit canceling for levels which are connected to repeatedly drop-back as they are dialed. Such levels as are connected for repeated drop-back, prior to this invention, could not be subsequently used to switch through thus reducing the number of available trunks to the selector and also reducing the capacity of the numbering scheme.

It is a principal object of the present invention to provide an improved drop-back selector for use in automatic telephone systems, the circuit embodying digit canceling and digit adding features together with an arrangement whereby the dialing of a predetermined digit unlocks all of the selector levels so that the selector switches through upon the dialing of any subsequent digit notwithstanding the fact that such subsequent digit is the same as has been previously used for digit canceling.

Another object of the invention is to provide an improved drop-back selector having arrangements to return busy tone whenever certain levels are selected in response to the dialing of any one of first predetermined digits for which the selector is not intended to respond when dialed as first digits, although such predetermined digits and corresponding selector levels may be used as subsequent digits to switch the selector through following the dialing of a different predetermined first digit.

The features of my invention which I believe to be novel are set forth in the appended claims. My invention itself, as to its organization and mode of operation together with further objects and advantages thereof, may best be understood by reference to the following description taken in connection with the accompanying drawing which shows the selector circuit of the invention in association with typical selector switches illustrated in block diagram form.

The drop-back selector circuit of the invention will be described in connection with the use of a directively stepped switch of the type known as an XY switch although it will be understood that other forms of directively operated stepping switches may be used by those skilled in the art. Details of the XY switch are described in the patent to Frank A. Morris, Number 2,567,650, issued September 11, 1951, to which reference may be made. Briefly described, however, the XY switch consists of four sets of wipers or contact brushes corresponding to tip, ring, sleeve, and hunt sleeve, mounted on a carriage for movement in two coordinate directions in the same plane including a primary movement in the X direction and a secondary movement in the Y direction. Banks of contact wires are positioned in levels opposite each step position of the wipers in the X direction and each of these levels contain sets of tip, ring, sleeve and hunt sleeve contact wires spaced in the Y direction corresponding to the secondary step positions of the switch in an arrangement that normally provides a 100 point switch. In addition to the four sets of wipers previously mentioned, two more sets of wipers or brushes which may be termed X and XX brushes respectively, are mounted for stepping movement in the Y direction as the switch moves in its primary or X direction. Thus the X and XX brushes together with their associated banks of X and XX wire contacts constitute switches that are differently operated in accordance with the level selected in the first or primary movement of the switch. In order to control the movement of the switch, X and Y magnets are provided to step the switch in the primary and secondary movements respectively, and, in addition, a Z magnet is provided to release the switch for returning the brushes to normal by spring action. The Y and Z magnets are provided with interrupter springs or contacts which are operated when such magnets are energized. The switch is also provided with X and Y off-normal switches that are operated when the switch moves off-normal in either direction, respectively, and, in addition, overflow switch contacts are provided to be operated when the switch is stepped in the Y direction beyond the tenth set of contact wires in a particular level so that useless stepping of the switch may be prevented. In the drawing the various off-normal, interrupter and overflow switch contacts have been shown detached from their respective operating elements and they will be identified by prefix lettering such as XOF, YOF, YI, ZI and OF. Also, as shown in the drawing, the X and XX brushes, together with their associated contact wire banks, are shown in detail in order that the wiring connected thereto to provide the drop-back selector features of the invention may be shown. However, the remaining contacts and details of the selector switches have not been shown inasmuch as they are not required for an understanding of the invention.

It is assumed that the directively operated switch SS110 has been directively pulsed to the required level and that an idle selector switch circuit shown in the drawing has been selected, causing switching relay S115 to operate in the well known manner. The calling party loop across line conductors T and R will cause calling bridge relay 110 to operate from ground (+) through normally closed contacts 141, XON111, 261, 271 and OF113, through winding 110A, normally closed contacts 131, selector switch bank and brush T, operated contacts S111, said loop connection from conductor T to conductor R, through operated contacts S112, selector switch brush and bank contact R, normally closed contacts 133, and through winding 110B to battery (−). Operation of calling bridge relay 110 energizes release delay relay 120 from ground through operated contacts 112. Slow release X delay relay 140 is also energized from ground through operated contacts 112, normally closed X off-normal contacts XON115, and through winding 140A to battery. Operation of relay 140 connects dial tone when required which is induced from a dial tone source through winding IND112 to winding IND111, through operated contacts 142, normally closed contacts XON111, 261, 271, OF113, and through calling bridge relay winding 110A and normally closed contacts 131 to incoming conductor T, to audibly indicate readiness of equipment for the subsequent dialing procedure.

Operation of slow release delay relay 120 connects ground through operated contacts 124 to the master ground lead and S bank and brush of the preceding selector switch SS110, to hold it in an operated condition while the call is in progress. Operation of relay 120 also fully lights the monitor lamp L110 from ground through operated contacts 127, normally closed contacts 139D, and through the monitor lamp L110 to battery, to visually indicate the seizure of the selector switch.

Assuming that the selector level 2 is desired, which is connected by wiring to the XX bank contact wires as will be later described to provide immediate trunk hunting, the calling bridge relay 110 will restore once for each of the two pulses of the digit, and the X magnet XM110 will step the brushes BR211—BR214 to the second level by connecting ground through pulsing contacts 111, operated contacts 121 and 143, and to windings 140B and XM110, to battery. X delay relay winding 140A is opened at normally closed X off-normal contacts XON111 and XON115 at the first step in the X direction and closed at XON112 to remove dial tone, but X delay relay 140 remains operated despite the opening of XON115 while pulses are being connected to its winding 140B, due to its slow-release characteristic. For purposes of the present description, with the wiring shown to the X and XX banks of the stepping switch, levels 8, 9 and 0 may also be used as an assumed first digit with the same general result and trunk hunting as when the digit 2 is used.

At the completion of the directive stepping procedure, X delay relay 140 restores to energize hunt assist relay 250 and cancel a relay 260 from ground through operated contacts 124, normally closed contacts 139B and 146, XX brush BR215, XX bank contact 2 and through wiring XX211 on XX bank for both relays, then for relay 250 to Y off-normal contacts YON117, overflow normally closed contacts OF116, Y magnet interrupter contacts YI, winding of relay 250, and through normally closed Z magnet interrupter contacts ZI to battery, and for relay 260 to normally closed contacts 144 and 273, the winding of relay 260, normally closed contacts 263, and normally closed Z magnet interrupter contacts ZI to battery. The operation of relay 260 opens normally closed contacts 261 and closes normally open contacts 262 to maintain ground on calling bridge relay winding 110A. Operation of hunt assist relay 250 energizes Y magnet YM110 from ground through operated contacts 124, normally closed contacts 138, operated contacts 252 and through Y magnet YM110 to battery. At the first step of the switch mechanism in the Y direction, said operating circuit for the hunt assist relay 150 will be opened at Y off-normal contacts YON117 and also at Y magnet interrupter contacts YI.

If the first set of contacts in the assumed level 2 is not in use, the S bank contact and S brush BR213 will not have ground connected to it, and switching relay 130 will be energized from ground through operated contacts 124, operated contacts YON118, normally closed contacts 145, winding of switching relay 130, normally closed overflow contacts OF116, Y magnet interrupter contacts YI, winding of hunt assist relay 250, and through Z magnet interrupter contact ZI to battery. The hunt assist relay 250 is so designed that it will not operate in series with the winding of the switching relay 130.

If the first contact of the assumed level 2 is in use, the S bank contact and S brush BR213 will have ground connected to it so that the hunt assist relay 250 will again operate, when Y magnet interrupter contacts YI reclose, from said ground on S contact and brush BR213, normally closed contacts 136, operated contacts 122, contacts OF116, Y magnet interrupter contacts YI, winding of hunt assist relay 250, and through Z interrupter contacts ZI to battery. Reoperation of hunt assist relay 250 again operates Y magnet YM110, to step the switch mechanism one additional step in the Y direction. This interaction between the hunt assist relay and the Y magnet continues until an idle S bank contact is encountered, causing the switching relay to operate as previously described.

If all of the S contacts in the assumed level 2 are in use, ground on the contacts will continue to operate the hunt assist relay and the Y magnet until overflow contacts OF116 are opened after the S brush BR213 has been stepped past the last S bank contact. Operation of contacts OF116 prevents further stepping in the Y direction and also prevents the operation of switching relay 130. Operation of the overflow contacts OF114 connects induction winding IND113, so that busy tone is transmitted through winding 110A of the calling bridge relay to the calling party, to indicate that no idle path is available on the level called. The calling party may now restore this selector and all preceding equipment by replacing the receiver or the handset which opens the loop circuit across conductors T and R. Relays 110 and 120 then restore to connect ground through normally closed contacts 125 and 139A, operated X off-normal contacts XON119, and through Z magnet ZM110 to battery, to in turn restore the switch mechanism to its normal condition ready for a succeeding call. Operation of the Z magnet ZM110 opens the operating battery for hunt assist relay 250 at Z interrupter contact ZI, and reconnects ground through Z interrupter contacts Z12 and normally closed contacts 123 to the incoming S bank contact, to prevent reseizure of this selector switch until the switch mechanism is fully restored to its normal position.

Assuming an idle line to have been selected, the operation of switching relay 130 connects incoming conductors T and R through operated contacts 132 and 134, capacitor C210, rectifier RE210 and winding 280A of meter control relay 280 and through brushes BR211 and BR212 and bank contacts T and R, to the succeeding selector switch SS220 shown in block diagram form. Meter control relay 280 will not operate at this time as the current flow in the TR loop is in the direction to be conducted through the rectifier RE210 which is therefore low resistance compared to the resistance of relay coil 280A until the said line current flow is reversed in direction when the called party answers. Operation of switching relay 130 also opens the holding circuit for the calling bridge relay 110, at contacts 131 and 133, which restores and, in turn, restores slow release relay 120 after a timing interval. Operation of the switching relay 130 also connects the incoming S conductor, through operated contacts 137, to the brush BR213 and S bank contact of the succeeding selector SS220 which functions to connect a multiple ground to the S conductor to hold switching relays 130, SS115 and all other preceding equipment after the release delay relay 120 has restored to open ground from the S conductor at contacts 124. The operation of switching relay 130 also opens ground from monitor lamp L110 at contacts 139D but the lamp L110 remains lighted with less brilliancy since ground is now connected through resistor R110, operated contacts 139E, and through monitor lamp L110 to battery. This changing of brilliancy from full to dimly lighted lamp indicates to an observer that the selector switch has been directively pulsed to an idle succeeding circuit, and serves as a visible indication to show the progress of a call through the selector switch without listening on conductors T and R. Such arrangement for operating the monitor lamp is the subject of my copended patent application Serial Number 317,291, filed October 28, 1952, entitled Selector.

On any call which switches through to a succeeding switch as described above, succeeding digits may be used to select a called party who will, upon answering, cause the current flow in the line conductors T and R to reverse in direction thereby operating meter control relay 280. The rectifier RE210, which has been previously described as a closed circuit with the current flow in the normal direction, now is an open circuit with the said current flow reversed, thus allowing relay 280 to operate through its winding 280A. Capacitor C210 also is an open circuit for the direct current flow in the line conductors but permits conversation over the conductors without interference. Relay 280, upon operating, closes a holding circuit for itself from ground through operated contacts 135 and 281, and through winding 280B to battery.

At the same instant that the current flow is reversed in the line conductors to operate relay 280 when the called party answers, battery is connected to the outgoing conductor HS from a succeeding switch, through bank contact brush BR214, operated contacts 139, normally closed contacts 282, and through winding of meter pulse relay 290 to ground, to energize such slow release meter pulse relay 290. Meter control relay 280 is designed to operate with a definite delay in starting its operation so that the meter pulse relay 290 operates fully and its core is fully saturated with magnetic flux before relay 280 starts to operate to open contacts 282 to restore said slow release relay 290. With relay 280 fully operated, meter pulse relay 290 restores, after a time interval due to its slow-release characteristic, to momentarily connect battery through the resistor R220, operated contacts 291 and 283 to the incoming conductor HS, bank contact HS and through operated contacts SS114, to a message meter circuit (not shown) which records a service charge registration in the well known manner. The message meter control described in this and the foregoing paragraph is the subject of my copending patent application, Serial Number 314,365, entitled Automatic Telephone System Selector with Message Rate Meter Control, filed October 11, 1952.

The various wiring possibilities for the level indicating X and XX switch banks of the XY stepping switch such as shown at X210 and XX214 and which are specified as required for the desired selector circuit responses will now be described in detail. While the various wirings are shown connected to certain X and XX bank contacts, it will be obvious that each wiring may be connected to any bank contact to meet the varying operating requirements.

The use of wiring XX211 has been previously described in connection with a call through this selector switch by using one selected digit only, namely the digit 2, 8, 9 or 0. If no wiring is used on either X or XX bank contacts as indicated by contact 1 of the drawing, the selector will rest on contact 1 without stepping in or switching through and busy tone will be audibly connected to the incoming party at the completion of one pulse. The busy tone path may be traced through winding IND113, operated contacts XON112, normally closed contacts 261, 271, OF113, winding 110A and normal contacts 131 to conductor T. Similarly, if XX bank contacts 3, 5 or 7 is used as a first digit, the busy tone will be connected to the calling party in a similar manner as described for digit 1. Selection of these levels by a digit following different preceding digits will be described subsequently.

If wiring XX214 and X210 is used on contact banks to be selected by a first or second digit as indicated by the wiring to bank contact 4, cancel B relay 270 will be energized when the X delay relay 140 restores at the completion of the directive pulses, by ground through wiring X210, brush BR216, normally closed contacts 268, 148 and 139C, operated contacts 113, normally closed contacts 277, and through winding of relay 270 to battery. Cancel B relay 270 also operates when XX bank contact 6 is selected, as subsequently described for other extra digit facilities. Operation of cancel B relay 270 closes a holding circuit for itself from ground through operated contacts 124, normally closed contacts 139B and 266, operated contacts 278, and through winding of relay 270 to battery. Operation of relay 270 also opens the circuit for the busy tone connection to the calling line at contacts 271 and connects the calling party line to ground, at operated contacts 272, without the busy tone indication. Operation of cancel B relay 270 also energizes the Z magnet ZM110, to restore the switch mechanically to its normal condition, by ground through operated contacts 124, normally closed contacts 139B and 146, brush BR215, XX bank contact 4, operated contacts 276 and 126, normally closed contacts 139A, contacts XON119, and through Z magnet ZM110 to battery. When contacts XON119 open at the completion of the restoration of the mechancial switch, X delay relay 140 reoperates from ground through contacts 112 and contacts XON115, as previously described.

If wiring XX213 and X210 is used as a first or second digit, as indicated by the wiring to bank contact 6, cancel B relay 270 will be energized by ground on wiring X210, as previously described. Cancel A relay 260 will also be operated from ground through operated contacts 124, normally closed contacts 139B and 146, XX brush BR215, bank contact 6, wiring XX213, operated contacts 274, winding of relay 260, normally closed contacts 263 and Z magnet interrupter contacts ZI to battery. Cancel A relay, upon operating, opens said operating battery for relay 260 at contacts 263 and closes a holding battery for itself through contacts 264. The operation of cancel A relay 260 closes a holding ground circuit for itself from the said operating ground through contacts 267, and restores cancel B relay 270 by opening its holding circuit at contacts 266 which is therefore effective after X delay relay 140 has reoperated when the switch mechanically restores to also open the other holding circuit for relay 270 at contacts 147. With relay 260 operated and relay 270 restored, any succeeding directive digit will function as described for level 2 as brush BR215 now becomes ineffective due to the said holding ground for relay 260 being connected through now closed contacts 273 to the switching relay 130 for the trunk hunting procedure as previously described. In other words, when a level is dialed having the wiring as shown connected to contact 6 whereby both relays 260 and 270 are operated following which the XY switch returns to normal and relay 270 is restored, all of the levels are unlocked for switching through upon the dialing of a succeeding digit. This is an important feature of the invention since it expands the possibilities of the numbering scheme by enabling all levels to be used for trunk hunting even though some of the levels are wired for digit canceling or adding on digits dialed prior to the dialing of the unlocking digit such as described for level 6.

The directive dialing of levels 2, 8, 9 and 0 as a first digit has been previously described as providing for the selective choice of an idle succeeding trunk and the subsequent dialing of further digits, as desired. The selection of the remaining levels 1, 3, 4, 5, 6 and 7 when selected by dialing the second digit after preceding digits which have caused the switch to drop-back will now be described.

If any digit is dialed after dialing digit one as a first digit and selecting level one, busy tone will continue to be audibly connected to the calling line since the selector switch rests on level one after the initial switch movement. If the level 1 is dialed immediately succeeding the dialing of digit 4 as the first digit, no further dialing is possible to any level and no audible busy tone will be connected to the calling party since relay 270 remains energized by the preceding dialing of digit 4 and no circuit is completed to operate the release magnet ZM110.

If the digit 4 has been dialed as a first digit, cancel B relay 270 is operated as previously described. If the digit 3 or the digit 4 is now dialed as a succeeding digit, release magnet ZM110 will operate at the completion of the dialing of either digit, by ground through operated contacts 124 and the previously described circuit path for the operation of the magnet ZM110, to restore the selector switch to its normal condition ready for a succeeding digit.

If the digit 5 or the digit 6 is dialed as a succeeding digit after digit 4 has been dialed, cancel A relay 260 is first operated and the XY switch restores to normal. Thereby relay 270 is restored as previously described when level 6 was dialed as a first digit, to connect the switching relay 130 for the trunk hunting procedure and unlock the switch for the dialing of a subsequent digit to any level and independent of the XX brush BR215 being connected to any XX bank contact.

If digit 7 is dialed as a succeeding digit following the dialing of digit 4 with relay 270 operated as described, the switching relay 130 will function for the trunk hunting procedure as wiring XX212 will be connected through operated contacts 275 to connect ground from operated contacts 124 to the said trunk hunting circuit previously described.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What is claimed is:

1. In a drop-back selector switch and circuit for use in in automatic telephone systems wherein the selector switch may be directively operated to move off-normal in a primary direction to select one of a plurality of levels and automatically operated to move off-normal in a secondary direction to hunt for an idle line in the selected level, means operated in response to successive directive primary movements of the switch to a first predetermined level to cause the switch to return to normal, means operated in response to the directive primary movement of the switch to a different predetermined level to cause the switch to return to normal, and means for thereafter responding to a next succeeding directive primary movement to any of the plurality of levels including the first predetermined level to thereby select the level and initiate the automatic secondary movement of the switch to hunt for an idle line in the selected level.

2. In a drop-back selector switch and circuit for use in automatic telephone systems wherein the selector switch may be directively operated to move off-normal in a primary direction to select one of a plurality of levels and automatically operated to move off-normal in a secondary direction to hunt for an idle line in the selected level, switch means operated to different positions in accordance with the primary movement of the selector switch, means controlled by said switch means and operated in response to successive directive primary movements of the selector switch to a first predetermined level to cause the selector switch to return to normal, means controlled by said switch means and operated in response to the directive primary movement of the selector switch to a different predetermined level to cause the selector switch to return to normal, and means for thereafter responding to a next succeeding directive primary movement to any of the plurality of levels including the first predetermined level to thereby select the level and intiate the automatic secondary movement of the selector switch to hunt for an idle line in the selected level.

3. In a drop-back selector switch and circuit for use in automatic telephone systems wherein the selector switch may be directively operated to move in a primary direction to selected ones of a plurality of levels and automatically operated to move in a secondary direction to hunt for an idle line in the selected level or move in a primary direction to a different level to cause said selector switch to drop back to normal, means operated in response to the first selection of a predetermined level by directive primary movement of the switch to prevent the automatic secondary movement of the switch and return busy tone to the calling line, and means operated in rseponse to a selection of the said predetermined level by directive primary movement of the switch after a first selection and drop-back of the switch to normal from said different level to thereby initiate the automatic secondary movement of the switch to hunt for an idle line in the said predetermined level.

4. In a drop-back selector switch and circuit for use in automatic telephone systems wherein the selector switch may be directively operated to move in a primary direction to selected ones of a plurality of levels and automatically operated to move in a secondary direction to hunt for an idle line in the selected level or move in a primary direction to a different level to cause said selector switch to drop back to normal, switch means operated to different positions in accordance with the primary movement of the selector switch, means controlled by said switch means and operated in response to the first selection of a predetermined level by directive primary movement of the selector switch to prevent the automatic secondary movement of the selector switch and return busy tone to the calling line, and means controlled by said switch means and operated in response to a selection of the said predetermined level by directive primary movement of the switch after a first selection and different operation of said switch means to drop-back the selector switch to normal from said different level to thereby initiate the automatic secondary movement of the selector switch to hunt for an idle line in the said predetermined level.

5. In a drop-back selector switch and circuit for use in automatic telephone systems wherein the selector switch may be directively operated to move off-normal in a primary direction to select one of a plurality of levels and automatically operated to move off-normal in a secondary direction to hunt for an idle line in the selected level, means operated in response to the first selection of a first predetermined level by directive primary movement of the switch to prevent the automatic secondary movement of the switch and return busy tone to the calling line, means operated in response to a selection of the first predetermined level by directive primary movement of the switch after a first selection of a level causing the switch to return to normal to thereby initiate the automatic secondary movement of the switch to hunt for an idle line in the said predetermined level, means operated in response to successive directive primary movements of the switch to a second predetermined level to cause the switch to return to normal, and means operated in response to the directive primary movement of the switch to a third predetermined level to cause the switch to return to normal and thereafter respond to a next succeeding directive primary movement to any of the plurality of levels including the first and second predetermined levels to thereby select the level and initiate the automatic secondary movement of the switch to hunt for an idle line in the selected level.

6. In a drop-back selector switch and circuit for use in automatic telephone systems wherein the selector switch may be directively operated to move off-normal in a primary direction to select one of a plurality of levels and automatically operated to move off-normal in a secondary direction to hunt for an idle line in the selected level, switch means operated to different positions in accordance with the primary movement of the selector switch, means controlled by said switch means and operated in response to the first selection of a first predetermined level by directive primary movement of the selector switch to prevent the automatic secondary movement of the selector switch and return busy tone to the calling line, means controlled by said switch means and operated in response to a selection of the first predetermined level by directive primary movement of the selector switch after a first selection of a level causing the selector switch to return to normal to thereby initiate the automatic secondary movement of the selector switch to hunt for an idle line in the said predetermined level, means controlled by said switch means and operated in response to successive directive primary movements of the selector switch to a second predetermined level to cause the selector switch to return to normal, and means controlled by said switch means and operated in response to the directive primary movement of the selector switch to a third predetermined level to cause the selector switch to return to normal and thereafter respond to a next succeeding directive primary movement to any of the plurality of levels including the first and second predetermined levels to thereby select the level and initiate the automatic secondary movement of the selector switch to hunt for an idle line in the selected level.

7. In a drop-back selector switch and circuit for use in automatic telephone systems wherein the selector switch may be directively operated to move off-normal in a primary direction to select one of a plurality of levels and automatically operated to move off-normal in a secondary direction to hunt for an idle line in the selected level, switch means operated to different positions in accordance with the primary movement of the selector switch, means controlled by said switch means and operated in response to the first selection of a first predetermined level by directive primary movement of the selector switch to prevent the automatic secondary movement of the selector switch and return busy tone to the calling line, means controlled by said switch means and operated in response to successive directive primary movements of the selector switch to a second predetermined level to cause the selector switch to return to normal, and means controlled by said switch means and operated in response to the directive primary movement of the selector switch to a third predetermined level to cause the selector switch to return to normal and thereafter respond to a next succeding directive primary movement to any of the plurality of levels including the first and second predetermined levels to thereby select the level and initiate the automatic secondary movement of the selector switch to hunt for an idle line in the selected level.

8. In a drop-back selector switch and circuit for use in automatic telephone systems wherein the selector switch may be directively operated to move off-normal in a primary direction to select one of a plurality of levels and automatically operated to move off-normal in a secondary direction to hunt for an idle line in the selected level, switch means operated to different positions in accordance with the primary movement of the selector switch, means controlled by said switch means and operated in response to the first selection of a first predetermined level by directive primary movement of the selector switch to prevent the automatic secondary movement of the selector switch and return busy tone to the calling line, and means controlled by said switch means and operated in response to the directive primary movement of the selector switch to a second predetermined level to cause the selector switch to return to normal and thereafter respond to a next succeeding directive primary movement to any of the plurality of levels including the first predetermined level to thereby select the level and initiate the automatic secondary movement of the selector switch to hunt for an idle line in the selected level.

9. In a drop-back selector switch and circuit for use in automatic telephone systems wherein the selector switch may be directively operated to move off-normal in a primary direction to select one of a plurality of levels and automatically operated to move off-normal in a secondary direction to hunt for an idle line in the selected level, switch means operated to different positions in accordance with the primary movement of the selector switch, means controlled by said switch means and operated in response to the first selection of a first predetermined level by directive primary movement of the selector switch to prevent the automatic secondary movement of the selector switch and return busy tone to the calling line, means controlled by said switch means and operated in response to a selection of the first predetermined level by directive primary movement of the selector switch after a first selection and drop-back from a different level to thereby initiate the automatic secondary movement of the selector switch to hunt for an idle line in the said predetermined level, means controlled by said switch means and operated in response to repeated and successive directive primary movements of the selector switch to a second predetermined level to cause the selector switch to return to normal after each successive primary movement, and means controlled by said switch means and operated in response to the directive primary movement of the selector switch to a third predetermined level to cause the selector switch to return to normal and thereafter respond to a next succeeding directive primary movement to any of the plurality of levels including the first and second predetermined levels to thereby select the level and initiate the automatic secondary movement of the selector switch to hunt for an idle line in the selected level.

References Cited in the file of this patent

UNITED STATES PATENTS

| | | |
|---|---|---|
| 1,626,103 | Simmons | Apr. 26, 1927 |
| 1,883,680 | Friendly | Oct. 18, 1932 |
| 2,029,018 | Cruickshank | Jan. 28, 1936 |
| 2,271,878 | Wadsworth | Feb. 3, 1942 |
| 2,513,400 | Carson | July 4, 1950 |